H. C. WAITE.
VEHICLE CONSTRUCTION.
APPLICATION FILED FEB. 23, 1915.
1,249,696.
Patented Dec. 11, 1917.
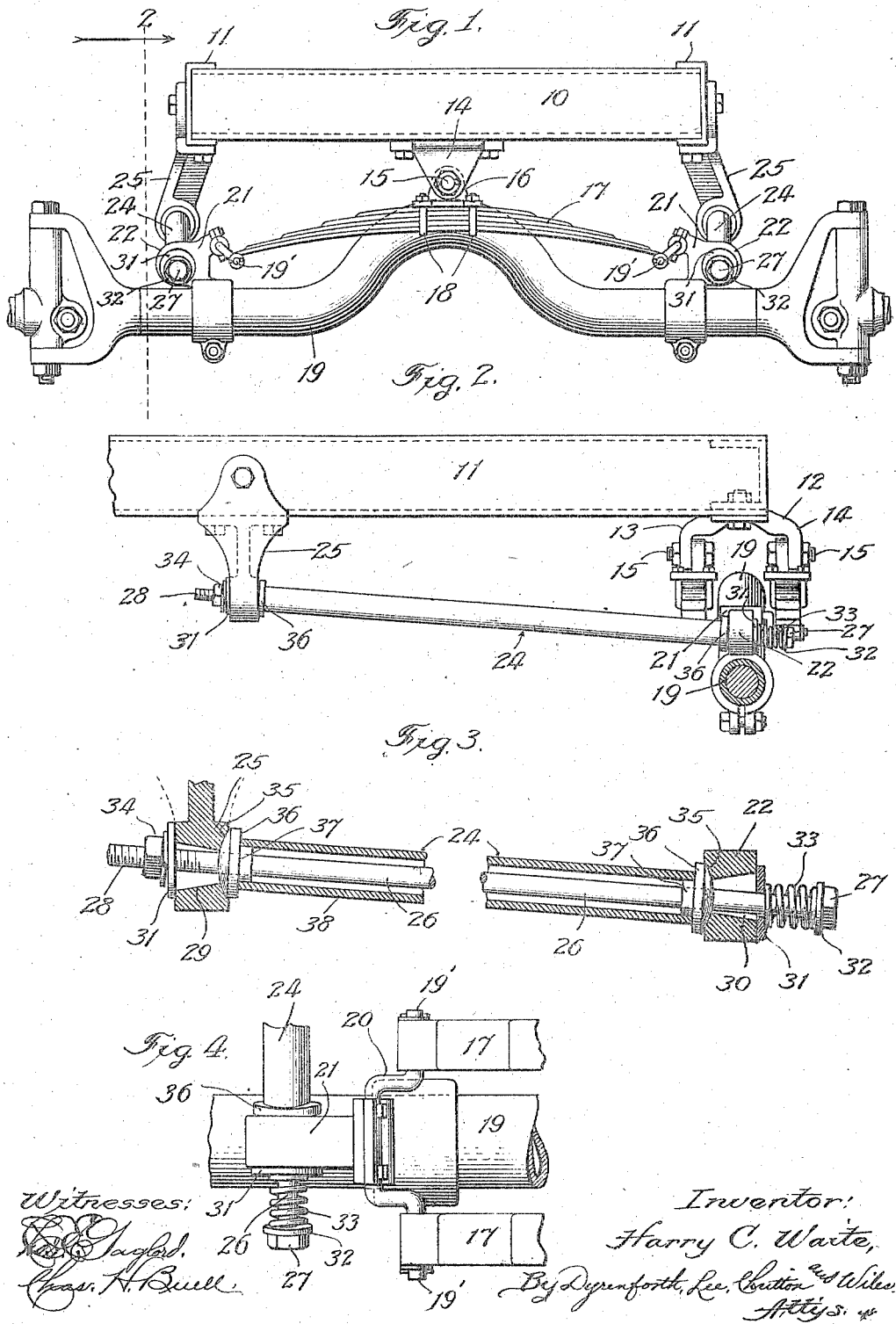
Witnesses:
Inventor:
Harry C. Waite,
By Dyrenforth, Lee, Chritton and Wiles
Attys.

UNITED STATES PATENT OFFICE.

HARRY C. WAITE, OF CHICAGO, ILLINOIS, ASSIGNOR, BY MESNE ASSIGNMENTS, TO ELGIN TRACTOR CORPORATION, A CORPORATION OF NEW YORK.

VEHICLE CONSTRUCTION.

1,249,696.   Specification of Letters Patent.   Patented Dec. 11, 1917.

Application filed February 23, 1915. Serial No. 9,882.

*To all whom it may concern:*

Be it known that I, HARRY C. WAITE, a citizen of the United States, residing at 12145 Stewart avenue, West Pullman, Chicago, in the county of Cook and State of Illinois, have invented new and useful Improvements in Vehicle Construction, of which the following is a specification.

My invention relates to improvements in vehicle construction, and more particularly to a means of connecting the axles of self-propelled vehicles to the chassis frames thereof.

The object of my invention is to provide a simple, strong and durable means for connecting the axle of a heavy vehicle, such as a tractor, for instance, to the chassis frame of the vehicle by means of a novel spring arrangement in combination with certain novel means for positively maintaining the axle and frame in fixed angular relationship.

For the purpose of making my invention more clear, I will describe in detail one specific construction in which I prefer to embody the invention. In this description reference will be had to the accompanying drawings, in which—

Figure 1 is a front elevation of a chassis frame and a front axle connected according to my invention. Fig. 2 is a fragmentary section taken on the line 2 of Fig. 1, and showing the front end of the frame. Fig. 3 is an enlarged sectional view of the radius rod and its hangers as employed in my invention, and Fig. 4 is an enlarged plan view of the double spring-shackle and radius rod connection on the end of the axle.

Referring more particularly to the drawing, the numeral 10 designates the front transverse member of my chassis frame, and the numerals 11 designate the longitudinal or side frame-members, all of these members being preferably of the standard channel form and with their flanges turned inwardly. Secured to the lower flange of the transverse frame-member 10 is a double U-shaped bracket, designated 12, and having rearwardly and forwardly extending arms 13, 14 respectively, in which are mounted spring-pivot-bolts 15. Pivoted on each of the bolts 15 is a spring-hanger 16 carrying an underslung semi-elliptic leaf-spring 17, spring-clips 18 of well known form being used to secure the springs to the hangers. The springs are mounted parallel to and on each side of the front axle 19 which, as shown, is of tubular form and bent upwardly in the center, the upwardly bent portion lying between the arms 13, 14 of the bracket 12. The ends of the twin-springs 17 are pivoted on studs $19^1$ carried by a shackle-member 20 which is journaled in a bracket 21 clamped about the axle 19. The shackle 20 and pivot-studs $19^1$ are preferably formed as a single double-ended crank which may be made up of solid bar stock. Each bracket 21 carries an offset portion 22 which forms a securing means for a radius rod, designated as a whole by 24, and extending between the bracket 21 and a bracket 25 bolted or riveted to the longitudinal frame-member 11, as shown in Fig. 2. The radius rod 24 is a compound structure comprising a central bar 26 headed as at 27 and threaded at the opposite end, as shown at 28, and passing through tapering bores 29, 30 formed respectively in the bracket 25 and in the offset 22 of the bracket 21. On the headed end 27 there are mounted washers 31, 32, the latter being large enough to completely cover the large end of the aperture 30, and between these washers is confined a helical compression-spring 33. The threaded end of the bar 26 has also a large washer 31 against which bears a nut 34, and in assembling the radius rod this nut will preferably be turned up to place the spring 33 under considerable compression. The opposed faces of the brackets 25 and 22 are each formed with a spherically curved seat 35, and bearing upon these seats are collars 36 similarly curved and shouldered, as at 37, to receive a tubular thrust-member 38 which is sleeved upon the bar 26. The collars 36 are each provided with central bores and freely slidable along the bar 26.

As will be seen from Fig. 1 in the drawings, one of these compound radius rods 24 is mounted at each end of the axle so as to hold the same securely in its proper transverse position with relation to the chassis frame.

The form of spring suspension which I have described is peculiarly applicable to the front axles of agricultural tractors, the advantage lying in the fact that in such vehicles the surfaces over which the wheels travel are so uneven as to require the greatest freedom of movement of the axles with relation to the frame.

By reference to Fig. 1 in the drawings it will be seen that the axle 19 may be tilted in either direction at an extreme angle with relation to the chassis frame-member 10, and this without any distortion of the springs. In effect, the front axle is pivoted on the pivot-bolts 15 and may rock freely in either direction about these alining pivots without imposing any load on the springs, and without any tendency to twist the chassis frame 11. One or the other of the front wheels may therefore run in a furrow, as in plowed ground, and the chassis frame may still maintain its normal horizontal plane. While the axle is capable of this unrestrained, tilting movement with relation to the frame, the radius rods 24 serve to maintain it at all times in its proper transverse relationship to the frame; and these rods take all longitudinal thrust strains and prevent any tendency to twist the springs 17.

The particular form of radius rod which I have designed for use in connection with my spring suspension is peculiarly advantageous in that it provides a desirable combination of rigidity against thrust and the necessary limited yielding movement under tension. Thus, it will be seen that, considering the brackets 25 as fixed pivots, the forward ends of the radius rods which are attached to the axle must swing in arcs which will inevitably vary somewhat from the theoretical straight-line path described by the axle. Entirely rigid connections between the brackets 25 and the axle will therefore constrain the latter to move in an arcuate path which will impose considerable twisting strain upon the spring 17 and cause great and unnecessary wear upon their pivots and shackles. By my construction the axle is free to take its normal straight-line path, being resisted only by the relatively light helical springs 33 of the radius rods, and at the same time the tubular thrust-members 38 of the radius rods adequately prevent the transmission of longitudinal shocks to the spring 17. In Fig. 2 of the drawings I have shown the radius rod 24 as inclining downwardly to a small extent. It will be understood that in practice the rod will be so arranged and the brackets 25 of such length as to maintain the rods approximately horizontal when the springs are normally compressed under the weight of the tractor-body. If the radius rods, under normal load, occupy this approximately horizontal position, it will be seen that the movement of either end of the axle either upward or downward will tend to lengthen instead of shorten the radius rods. The thrust tubes 38 may therefore be made of such length as to be in engagement at both ends with the axle-bracket and with the supporting-bracket when the springs are under normal compression. The form of radius rod illustrated in the drawing is further desirable in that the springs 33 hold all of the parts in contact at all times, and automatically take up any slight wear which may take place on the bearing surfaces 35, 36 so that the objectionable rattling so often found in radius rod constructions is avoided by my invention.

While I have shown and described the invention as applied to a front axle, it will be readily understood that the form of spring suspension shown might equally well be applied to the rear axle, and that it is applicable not only to automobile or tractor construction, but to all vehicle constructions in which an axle is to be maintained in fixed transverse relation to the vehicle frame, and at the same time is to be permitted to rock freely in a vertical plane.

While I have shown and described in considerable detail one preferred embodiment of my invention, it is to be understood that I do not regard the invention as limited to the specific constructions so illustrated or to any feature of them, except in so far as such limitations may be included within the terms of the following claims in which it is my intention to claim all novelty inherent in the invention as broadly as is permissible in view of the prior art.

What I claim as new and desire to secure by Letters Patent is:—

1. In vehicle construction and in combination, a vehicle-frame having a transverse end-member, a U-shaped bracket carried by the end-member and having its arms extending downwardly, a pair of spaced parallel springs mounted transversely of the frame and pivoted at their centers to the arms of the said bracket, an axle lying between the said springs and shackled thereto at its ends, and radius rods extending between the ends of the axle and the frame and pivoted at their ends to permit the axle to move in a vertical plane relative to the frame.

2. In vehicle construction and in combination, a vehicle frame, a spring mounted on the frame, an axle carried by the spring, a seat member carried by the axle, an opposed seat member carried by the frame, and a radius rod having a rigid compression member extending between and bearing against the said seat members and a yielding tension member connected with the said axle and frame.

3. In vehicle construction and in combination, a vehicle frame, a spring mounted on the frame, an axle carried by the spring, a spherical seat member carried by the axle, an opposed spherical seat member carried by the frame, a radius rod extending between the said seat members and having spherical bearing surfaces seated therein, and yielding connections between said radius rod and said axle and frame.

4. In vehicle construction and in combination, a vehicle frame, a spring mounted on the frame, an axle carried by the spring, a spherical seat member carried by the axle and having a bore entering its spherical surface, an opposed spherical seat member carried by the frame and having a bore entering its spherical surface, a radius rod extending between the said seat members and having bearing thereagainst and provided with extended portions entering the said bores, and yielding connections between said extended portions and said frame and axle.

5. In vehicle construction and in combination, a vehicle-frame, a spring mounted transversely of the frame and secured thereto at its center, an axle lying parallel to and supported by the ends of the spring, and a compound radius rod connecting said axle to the said frame, said rod including a tubular thrust-member having bearing at its ends against the axle and the frame, and a central tension-member passing freely through the bore of the said thrust-member and having yielding connection with the said axle and frame.

6. In vehicle construction and in combination, a vehicle-frame, a spring mounted transversely thereof and secured thereto at its center, an axle lying parallel to the spring and supported by the ends of the latter, a spherical seat-member carried by the axle, a spherical seat-member carried by the frame, a tubular thrust-member extending between the said seat members and having bearing thereagainst, and a central tension-member passing freely through the bore of the said thrust-member and having yielding connection at its ends with the said bearing-members.

HARRY C. WAITE.

In presence of—
  D. C. Thorsen,
  O. C. Avisus.

Copies of this patent may be obtained for five cents each, by addressing the "Commissioner of Patents, Washington, D. C."